US012741255B2

(12) United States Patent
Krishnan et al.

(10) Patent No.: US 12,741,255 B2
(45) Date of Patent: Sep. 22, 2026

(54) AUTOMATED DRILLING FLUIDS MIXING SERVICE

(71) Applicant: Baker Hughes Oilfield Operations LLC, Houston, TX (US)

(72) Inventors: Aswath Krishnan, Spring, TX (US); Charles A. Thompson, Jr., Kingwood, TX (US); Reza Ettehadi Osgouei, Spring, TX (US); Finn Oivind Fevang, Rogaland (NO); Nils Kaageson-Loe, Claremore, OK (US)

( * ) Notice: Subject to any disclaimer, the term of this patent is extended or adjusted under 35 U.S.C. 154(b) by 394 days.

(21) Appl. No.: 18/497,599

(22) Filed: Oct. 30, 2023

(65) Prior Publication Data

US 2025/0135418 A1 May 1, 2025

(51) Int. Cl.

*B01F 35/22* (2022.01)
*B01F 35/213* (2022.01)
*G05B 13/02* (2006.01)
*B01F 101/49* (2022.01)

(52) U.S. Cl.

CPC ........ *B01F 35/2202* (2022.01); *B01F 35/213* (2022.01); *G05B 13/0265* (2013.01); *B01F 2101/49* (2022.01)

(58) Field of Classification Search

CPC .................................................. B01F 35/2202
See application file for complete search history.

(56) References Cited

U.S. PATENT DOCUMENTS

| | | | | |
|---|---|---|---|---|
| 11,236,610 | B2 | 2/2022 | Kleinguetl et al. | |
| 2008/0202216 | A1* | 8/2008 | Campbell | G01N 35/1095 73/866 |
| 2012/0013335 | A1 | 1/2012 | Saasen et al. | |
| 2014/0166361 | A1* | 6/2014 | Jamison | E21B 44/00 175/24 |

(Continued)

FOREIGN PATENT DOCUMENTS

| | | | |
|---|---|---|---|
| BR | 102020017173 | A2 | 3/2022 |
| CN | 113279747 | A | 8/2021 |

(Continued)

OTHER PUBLICATIONS

Aljubran et al., "Drilling Fluid Properties Prediction: A Machine Learning Approach to Automate Laboratory Experiments"; Research Square; Mar. 7, 2022; 21 pages.

(Continued)

*Primary Examiner* — Suresh Suryawanshi
(74) *Attorney, Agent, or Firm* — Baker Hughes Company

(57) ABSTRACT

A computer-implemented method includes determining a chemical mixture for a drilling fluid and maintaining or updating the chemical mixture. Determining the chemical mixture is based on a first interdependency of a first target property of a set of properties associated with the drilling fluid and a first substance to be added for the chemical mixture. Determining the chemical mixture is based on a second interdependency of the first target property and a second substance to be added for the chemical mixture. Maintaining or updating the chemical mixture is based on a (Continued)

first measurement of the first target property, a second measurement of a second target property of the set of properties, or combinations including one of the foregoing.

20 Claims, 4 Drawing Sheets

(56) References Cited

U.S. PATENT DOCUMENTS

| | | | | |
|---|---|---|---|---|
| 2015/0170087 | A1* | 6/2015 | Johnston | G06Q 10/06316 705/7.26 |
| 2017/0343969 | A1* | 11/2017 | Dykstra | E21B 44/005 |
| 2018/0023355 | A1 | 1/2018 | Teodorescu et al. | |
| 2021/0404334 | A1 | 12/2021 | Kulkarni et al. | |
| 2022/0243544 | A1* | 8/2022 | Clarke | E21B 44/00 |
| 2024/0328265 | A1* | 10/2024 | Saihati | E21B 21/06 |
| 2025/0059864 | A1* | 2/2025 | Fu | E21B 43/255 |

FOREIGN PATENT DOCUMENTS

| | | | |
|---|---|---|---|
| CN | 114004999 | A | 2/2022 |
| WO | 2017040158 | A1 | 3/2017 |
| WO | 2021066812 | A1 | 4/2021 |

OTHER PUBLICATIONS

International Search Report & Written Opinion in International Application No. PCT/US2024/053205, mailed Feb. 4, 2025; 10 pages.

Shadravan et al., “Intelligent Tool to Design Drilling, Spacer, Cement Slurry, and Fracturing Fluids by Use of Machine-Learning Algorithms”; Society of Petroleum Engineers, SPE Paper 175238; Oct. 11, 2015; 10 pages.

* cited by examiner

AUTOMATED DRILLING FLUIDS MIXING SERVICE

BACKGROUND

In the resource recovery and fluid sequestration industries, drilling fluids (also referred to herein as drilling mud or mud) may support downhole operations for carrying rock cuttings to the surface and for lubricating and cooling a drill tool. In some cases, drilling fluids, by hydrostatic pressure, assist in preventing ground formations or other substances from collapsing into a borehole. Techniques for effectively managing properties of the drilling fluids are desired.

SUMMARY

Embodiments of the present disclosure include a computer-implemented method including determining a chemical mixture for a drilling fluid; and maintaining or updating the chemical mixture. Determining the chemical mixture is based on: a first interdependency of a first target property of a set of properties associated with the drilling fluid and a first substance to be added for the chemical mixture; and a second interdependency of the first target property and a second substance to be added for the chemical mixture. Maintaining or updating the chemical mixture is based on a first measurement of the first target property, a second measurement of a second target property of the set of properties, or combinations including one of the foregoing.

Embodiments of the present disclosure include a system including: analysis equipment including a processor and a memory, wherein the memory includes instructions stored thereon that, when executed by the processor, cause the processor to perform operations including determining a chemical mixture for a drilling fluid; and maintaining or updating the chemical mixture. Determining the chemical mixture is based on: a first interdependency of a first target property of a set of properties associated with the drilling fluid and a first substance to be added for the chemical mixture; and a second interdependency of the first target property and a second substance to be added for the chemical mixture. Maintaining or updating the chemical mixture is based on a first measurement of the first target property, a second measurement of a second target property of the set of properties, or combinations including one of the foregoing.

Embodiments of the present disclosure include a computer program product including a computer readable storage medium having program instructions embodied therewith, the program instructions executable by a processor to cause the processor to perform operations including determining a chemical mixture for a drilling fluid; and maintaining or updating the chemical mixture. Determining the chemical mixture is based on: a first interdependency of a first target property of a set of properties associated with the drilling fluid and a first substance to be added for the chemical mixture; and a second interdependency of the first target property and a second substance to be added for the chemical mixture. Maintaining or updating the chemical mixture is based on a first measurement of the first target property, a second measurement of a second target property of the set of properties, or combinations including one of the foregoing.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
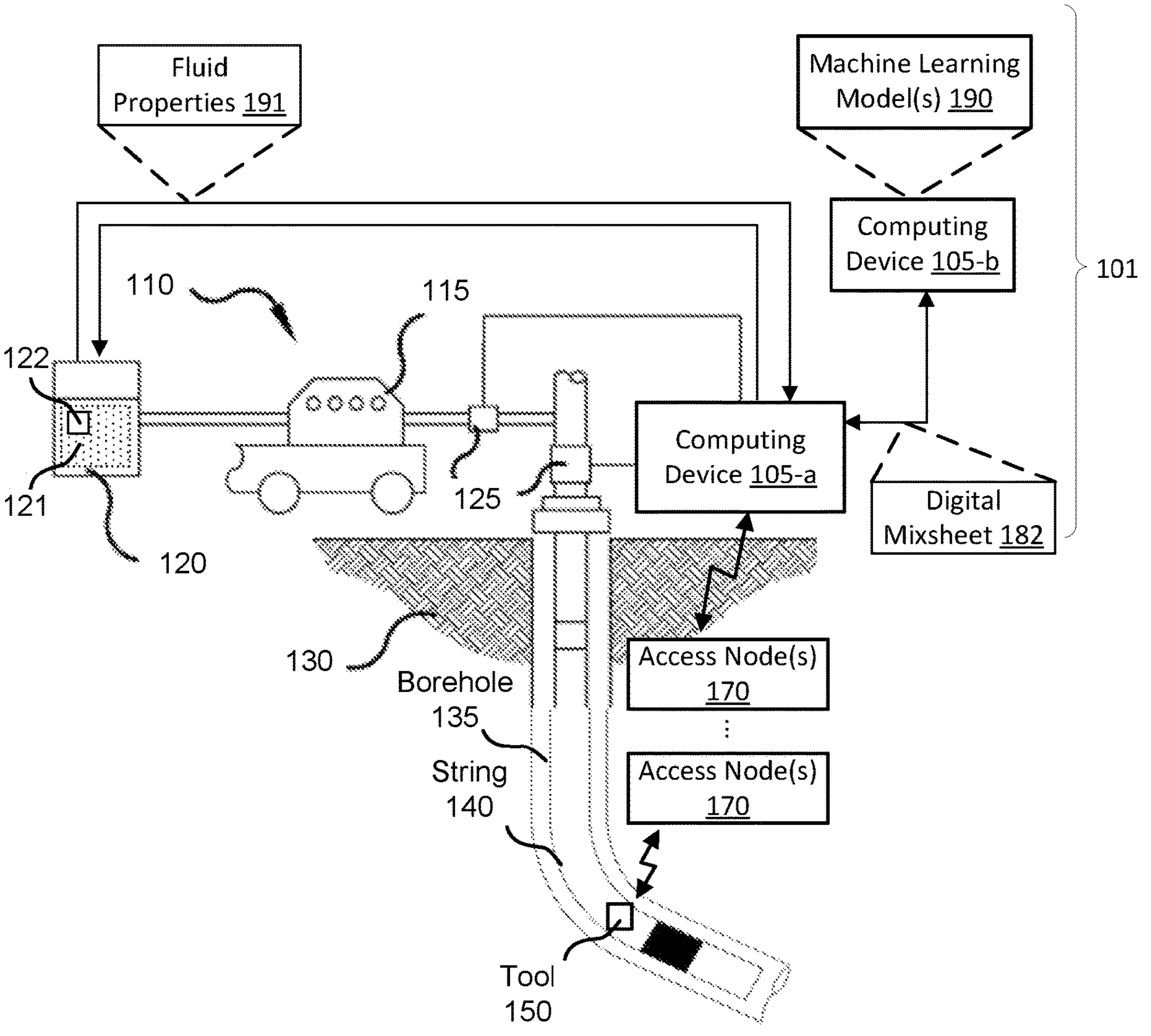
FIG. 1 is a diagram illustrating an example embodiment of a system for performing energy industry operations associated with determining, maintaining, and updating a chemical mix sheet for a drilling fluid in accordance with aspects of the present disclosure.

A detailed description of one or more embodiments of the disclosed apparatus and method are presented herein by way of exemplification and not limitation with reference to the Figures.

According to one or more embodiments of the present disclosure, systems and techniques are described that support an automated drilling fluids mixing service. The systems and techniques described herein support operations for creating a chemical mix sheet using a machine learning operations. In some aspects, the operations include monitoring real-time fluid properties of a drilling fluid. The operations may include analyzing one or more trends associated with properties of the drilling fluid and/or substances added to the drilling fluid. For example, the operations may include real-time analysis of fluid properties of the drilling fluid in response to substances (also referred to herein as additives) added to the drilling fluid.

In some examples, based on the analysis, the operations may include the creation or modification of a digital mix sheet in association with maintaining target fluid specifications (also referred to herein as target properties) of the drilling fluid. In one or more embodiments, the systems and techniques described herein include transmitting the digital mix sheet to hardware capable of autonomously producing or modifying the drilling fluid. The techniques described herein may provide improved service delivery and efficiency associated with maintaining or modifying a drilling fluid.

According to one or more embodiments of the present disclosure, the systems and techniques described herein provide a holistic approach involving interdependent multi-parameter optimization of a drilling fluid. In some aspects, the holistic approach to multiparameter optimization may entail the consideration of synergistic effects between products to be added to the drilling fluid and measured properties of the drilling fluid. For example, with respect to interdependent multi-parameter optimization, the holistic approach may consider the interdependency associated with the addition of a substance ‘A’ and drilling fluid properties such as, for example, fluid density and rheology. Similarly, for example, the holistic approach may consider the interdependency associated with the addition of a substance ‘B’ and drilling fluid properties different from and/or in addition to the drilling fluid properties affected by substance ‘A.’

In one or more embodiments, by incorporating the interactions between products to be added, predicted properties of the drilling fluid, and/or resultant properties of the drilling fluid, the optimization operations described herein may take into account changes in multiple properties to refine the addition of a product (or products). The techniques described herein support a meticulous evaluation of such example intricate relationships in introducing products (e.g., substances 'A' and 'B') to achieve specific target properties of a drilling fluid. The terms "substance," "additive," and "product" described herein with reference to being added to or combined in a chemical mixture for a drilling fluid may be used interchangeably herein.

According to one or more embodiments of the present disclosure, the systems and techniques described herein support the optimization of actions (e.g., decisions regarding when to add a product to a drilling fluid mixture, which products to add, amounts of the product(s), mix rate associated with adding the product(s), corrective actions for adjusting the properties of the drilling fluid, and the like) in view of obtaining target fluid properties of a drilling fluid.

In some examples, the systems and techniques described herein include autonomous and/or semi-autonomous measurement of the fluid properties using real-time sensors. In some examples, the systems and techniques include operator implemented fluid checks or measurements (e.g., manual checks or measurements). The systems and techniques described herein include implementing the sensor-based measurements and the operator implemented measurements based on suitable temporal criteria for monitoring the fluid properties of the drilling fluid.

Machine learning techniques described herein include determining one or more actions described herein based on processing, using one or more trained machine learning models, the sensor-based measurements and/or operator implemented measurements. Accordingly, for example, the techniques described herein support providing feedback (e.g., effects of mixing one or more products into a chemical mixture, as determined using the sensor-based measurements and/or operator implemented measurements) to the machine learning models, thereby providing constant or semi-constant monitoring of the fluid properties for any deviation, and further, tuning of the machine learning models.

Example aspects of the generation and transmission of a digital mix sheet and the providing of iterative feedback for training and/or retraining of machine learning models are later described herein.

FIG. 1 is a diagram illustrating an example embodiment of a system 100 for performing energy industry operations associated with creating and maintaining a chemical mix sheet in accordance with aspects of the present disclosure.

The system 100 is configured to perform any suitable energy industry operation, such as, for example, a drilling operation, a stimulation operation, a measurement operation and/or a production operation.

The system 100 includes a borehole 135 in a subsurface formation 130. A borehole string 140 (also referred to herein as a drill string) is disposed in the borehole 135 that penetrates the formation 130. The borehole 135 may be an open hole, a cased hole or a partially cased hole. In one embodiment, the borehole string 140 is a stimulation or injection string that includes a tubular, such as a coiled tubing, pipe (e.g., multiple pipe segments) or wired pipe, that extends from a wellhead at a surface location (e.g., at a drill site or offshore stimulation vessel).

As described herein, a "string" refers to any structure or carrier suitable for lowering a tool or other component through a borehole or connecting a drill bit to the surface, and is not limited to the structure and configuration described herein. The term "carrier" as used herein means any device, device component, combination of devices, media and/or member that may be used to convey, house, support or otherwise facilitate the use of another device, device component, combination of devices, media and/or member. Example non-limiting carriers include casing pipes, wirelines, wireline sondes, slickline sondes, drop shots, downhole subs, BHAs and drill strings.

In one embodiment, the system 100 is configured as a hydraulic stimulation system. As described herein, "hydraulic stimulation" includes any injection of a fluid into a formation. A fluid may be any flowable substance such as a liquid or a gas, and/or a flowable solid such as sand. In this embodiment, the borehole string 140 includes a stimulation assembly that includes one or more tools 150 or components to facilitate stimulation of the formation 130. Non-limiting examples of the tools 150 included in the borehole string 140 include a fracturing assembly (e.g., a fracture or "frac" sleeve device), a perforation assembly (e.g., shaped charges, torches, projectiles and other devices for perforating the borehole wall and/or casing), and isolation or packer subs.

One or more of the tools 150 may include suitable electronics or processors configured to communicate with a surface processing unit (e.g., a computing device 105) and/or control the respective tool 150 or assembly.

The system 100 includes surface equipment 110 for performing various energy industry operations. For example, the surface equipment 110 is configured for injection of fluids into the borehole 135 in order to, e.g., fracture the formation 130. In one or more embodiments, the surface equipment 110 includes an injection device such as a high pressure pump 115 in fluid communication with a fluid tank 120, mixing unit or other fluid source or combination of fluid sources. The pump 115 injects fluid into the borehole string 140 or the borehole 135 to introduce fluid into the formation 130, for example, to stimulate and/or fracture the formation 130. The pump 115 may be located downhole or at a surface location.

One or more flow rate and/or pressure sensors 125 may be disposed in fluid communication with the pump 115 and the borehole string 140 for measurement of fluid characteristics. The sensors 125 may be positioned at any suitable location, such as proximate to (e.g., at the discharge output) or within the pump 115, at or near the wellhead, or at any other location along the borehole string 140 or the borehole 135. The sensors described herein are exemplary, as various types of sensors may be used to measure various parameters.

A computing device 105 (e.g., computing device 105-*a*) may be disposed in operable communication with components such as sensors 125 located above the surface, the pump 115, and/or downhole components. For example, the computing device 105 may be in operable communication with sensors (e.g., pressure sensors, temperature sensors, vibration sensors, gas sensors, and the like) located below the surface and/or in the borehole string 140. In some examples, the computing device 105-*a* may be in operable communication with a tool 150 (or multiple tools).

The system 100 supports communication between the computing device 105 and other devices of the system 100 via wired communication protocols, wireless communication protocols (e.g., electromagnetic (EM) signals, WiFi, Bluetooth™, ZigBee™, Ubiquiti™, 3G, 4G, LTE, and the like), and/or combinations including one or more of the foregoing.

The system 100 supports telemetry techniques capable of transmitting data from components located downhole to the surface and/or surface equipment 110. Non-limiting examples of the telemetry techniques include acoustic telemetry or mud pulse (MP) telemetry supportive of transmitting information by generating vibrations in fluid in the borehole 135, electromagnetic (EM) telemetry supportive of transmitting information by way of signals that propagate at least in part through the earth (e.g., through formations 130). Other non-limiting examples of telemetry techniques supported by aspects of the present disclosure include the use of hardwired drill pipe, fibre optic cable, or drill collar acoustic telemetry to carry data to the surface and/or surface equipment 110.

The system 100 may include one or more access nodes 170 supportive of communicating data along the borehole string 140 (e.g., up or down the borehole string 140). In one or more embodiments, the access nodes 170 may be implemented in the borehole 135 or a communication borehole (not illustrated) separate from the borehole 135. In some examples, the one or more access nodes 170 may provide functionality as wireless access nodes for relaying data from a tool 150 to the surface (e.g., to a computing device 105).

In one or more embodiments, the system 100 may include a chain of access nodes 170 spaced apart along the borehole string 140, and the chain of access nodes 170 may support repeating of data in a unidirectional (e.g. downhole to surface or surface to downhole) or bidirectional manner. For example, an access node 170 (or chain of access nodes 170) may support the communication of data between a computing device 105, a tool 150, and the like.

Accordingly, for example, the communication protocols and telemetry techniques supported by the system 100 enable communication between computing devices 105 (e.g., computing device 105-*a*, computing device 105-*b*, and the like) and downhole components.

The computing device 105 is configured to receive, store and/or transmit data generated from components (e.g., pump 115, fluid tank 120, sensors 122, sensors 125, and the like) included in the surface equipment 110 and/or downhole components (e.g., a tool 150, downhole sensors, and the like). The computing device 105 includes processing components configured to analyze received data (e.g., data received from the pump 115, fluid tank 120, sensors 125, a tool 150, and the like). The computing device 105 includes processing components configured to provide data (and/or control signals to other components of the system 100. The computing device 105 includes any number of suitable components, such as processors, memory, communication devices and power sources.

The computing device 105 may include processing circuitry capable of executing instructions stored on a memory of the computing device 105 in association with performing one or more functions described herein. The processor may utilize data stored in the memory as a neural network. The neural network may include a machine learning architecture. In some other aspects, the neural network may be or include any suitable machine learning network for performing operations described herein. Non-limiting examples of the machine learning network include a deep learning network, a convolutional neural network, a reconstructive neural network, a generative adversarial neural network, or any other neural network capable of accomplishing functions of the computing device 105 described herein. Some elements stored in the memory may be described as or referred to as instructions or instruction sets, and some functions of the computing device 105 may be implemented using machine learning techniques.

The system 101 may include machine learning model(s) 190 which may be trained and/or updated based on training data (e.g., field test data 310, lab test data 315, feedback 341, and/or feedback 348 later described with reference to FIG. 3) provided or accessed by any devices or systems described herein. The machine learning model(s) 190 may be built and updated by the computing device 105 based on the training data (also referred to herein as training data and feedback).

The machine learning model(s) 190 may be provided in any number of formats or forms. In one or more embodiments, the operations described herein may implement machine learning and/or rule-based systems to generate a mixing instruction. In one or more embodiments, the system 101 may include (e.g., for theoretical and empirical processes) rule-based systems using predefined rules to make decisions or perform tasks, which may operate based on if-then statements.

In one or more embodiments, the system 101 may include natural language processing (NLP) techniques supportive of the interaction between computers and human language, enabling machines to understand, interpret, and generate human language (e.g., for mixing instruction text).

In one or more embodiments, the system 101 may include computer vision techniques supportive of image processing, object recognition, and image segmentation. In an example, the computer vision techniques may support the integration of particle size distribution (PSD) sensor data (e.g., from sensors 122) into a mixing instruction of defined fluid loss (e.g., required fluid loss), bridging and lost circulation material.

In one or more embodiments, the system 101 may include data mining techniques supportive of discovering patterns and relationships in large datasets (e.g., from field test data 310, lab test data 315, a repository of current fluid properties data 245, and the like) and extract information. For example, the data mining techniques may support the discovery of interdependencies described herein (e.g., interdependencies between properties of a drilling fluid 121 and substances 211).

In one or more embodiments, the system 101 may include or implement genetic algorithms supportive of determining approximate solutions to optimization and search problems, expert systems (computer systems) configured to emulate the decision-making ability of a human expert in a specific domain, fuzzy logic techniques supportive of modeling uncertainty and imprecision in data, simulation and modeling, regression analysis, clustering techniques, and dimensionality reduction (e.g., principal component analysis (PCA) or t-SNE).

Example aspects of the machine learning model(s) 190, such as generating (e.g., building, training) and applying the machine learning model(s) 190, are described with reference to the figure descriptions herein.

According to one or more embodiments of the present disclosure, systems and techniques are described that support features of an automated drilling fluid mixing system. The systems and techniques described herein support an automation solution for a workflow that is manually implemented (manual-oriented) according to some other approaches.

System 101 includes a rig site software application for creating and managing digital mix sheets 182, a machine learning algorithm capable of generating and recommending chemical mixtures based on target fluid properties for a drilling fluid 121, a real-time sensor system (including sensors 122) for monitoring fluid properties 191, and a hardware agnostic/vendor agnostic communication protocol for sharing a digital mix sheet 182 with third-party automation systems.

Aspects of the system 101 described herein support reducing operator workload and enhancing the efficiency of drilling fluid mixing operations. Example aspects of methods, procedures, and processes supported by the system 101 are described herein. The automation supported by system 101 entails a comprehensive software application design that enables a gradual shift from a manual to automated workflow, fostering increased user confidence. The system 101 provides an interface (e.g., at computing device 105) that enables operators (e.g., field engineers) with the ability to manually create and organize a digital mix sheet 182. In one or more embodiments, the system 101 integrates a machine learning algorithm (implemented using one or more trained machine learning models 190) that, based on available products, current fluid properties 191, and target fluid properties 191, is capable of generating and providing a suggested digital mix sheet 182 to operators for verification and/or modification.

For example, the system 101 provides operators an interface for reviewing the digital mix sheet 182 for confirming or modifying the digital mix sheet 182. In an example, once the digital mix sheet 182 has been reviewed and confirmed (or modified) by an operator, the computing device 105 may dispatch the digital mix sheet 182 to an automation solution for execution.

In one or more embodiments, aspects of the automation solution may be implemented at computing device 105 (e.g., computing device 105-*a*), another computing device 105 (e.g., computing device 105-*b*) in electronic communication with the computing device 105 via a wired and/or wireless communication protocol, surface equipment 110, and/or processing circuitry included in the surface equipment 110. In the example of FIG. 1, computing device 105-*a* may be located at the drill site, and computing device 105-*b* may be located at the drill site or at a remote site. In some cases, computing device 105-*b* may be a server.

Non-limiting examples of the hardware agnostic/vendor agnostic communication protocol supported by the system 101 for communicating the digital mix sheet 182 include OPC-UA, HTTP, TCP/IP, APIs, WITS, WITSML, serial communication, and the like. The use of hardware agnostic/vendor agnostic communication protocols ensures versatility, scalability, and the seamless transmission of digital mix sheets 182 to third-party automation systems. In some aspects, the system 101 may support publishing generated digital mix sheets 182 to a host server (e.g., computing device 105-*b* or another computing device 105), and the system 101 may support accessing and downloading the digital mix sheets 182 by a computing device 105 (e.g., computing device 105-*a*) located at a drill site.

In one or more embodiments, the file format of the digital mix sheet 182 may be vendor agnostic. A computing device 105 may electronically transmit the digital mix sheet 182 to circuitry (e.g., processing circuitry and control circuitry) capable of controlling mixing equipment using a suitable hardware agnostic/vendor agnostic communication protocol described herein. In some examples, the control circuitry and/or the mixing equipment may be integrated with or separate from fluid tank 120. The circuitry may, based on electronically processing the digital mix sheet 182, generate and provide a control signal to the mixing equipment in association with preparing the chemical mixture.

According to one or more embodiments of the present disclosure, the system 101 supports improving the machine learning algorithm based on feedback provided by an operator. In an example, any changes or confirmations made by the operator in association with a digital mix sheet 182 generated by the machine learning algorithm are recorded to improve the algorithm (e.g., to tune the associated machine learning model(s) 190). Example aspects of improving the machine learning algorithm based on feedback are later described with reference to FIG. 3.

In one or more embodiments, the real-time sensor system (including sensors 122) is capable of monitoring and feeding data to the computing device 105. The data may include fluid properties 191 as measured by the sensors 122, based on which the computing device 105 (using machine learning algorithm) may identify deviations or projected variations from target specifications for the drilling fluid 121. For example, based on a determined deviation or projected variation from the target specifications, the computing device 105 (using machine learning algorithm) may generate an updated chemical mixture and update the digital mix sheet 182. Example aspects of maintaining the chemical mixture and/or generating an updated chemical mixture (and updated digital mix sheet 182) are later described with reference to FIG. 2.

The system 101 provides features advantageous for supporting a seamless transition from manual workflows to automated workflows. The system 101 supports remote operation through reduced workload and improved efficiency. The solutions described herein for drilling fluid automation, machine learning operations, and communication methodologies described herein provide advantages of assisting operators and service companies to improve service delivery quality, safety, and sustainability.

Additional example and/or alternative aspects of the system 100 and system 101 will further be described with reference to the following figures.

Figure 2:
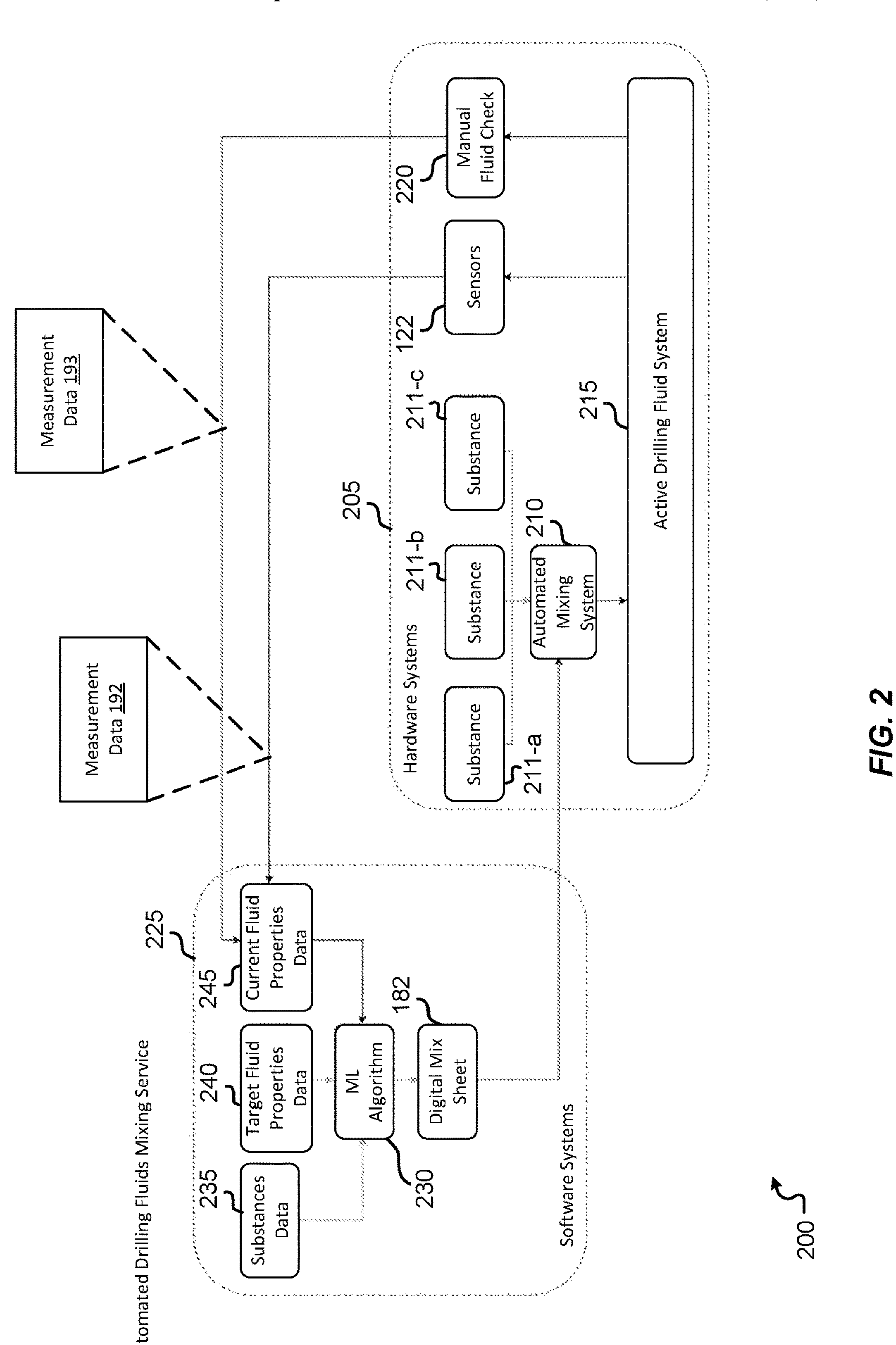
FIG. 2 illustrates an example of hardware systems and software systems supportive of determining, maintaining, and updating a chemical mix sheet for a drilling fluid in accordance with one or more embodiments of the present disclosure.

FIG. 2 illustrates an example 200 of hardware systems 205 and software systems 225 in accordance with one or more embodiments of the present disclosure. The hardware systems 205 and software systems 225 may be implemented by system 100 of FIG. 1. For example, the hardware systems 205 and software systems 225 may be implemented by a computing device 105, surface equipment 110 (e.g., processing circuitry included in the surface equipment 110), and/or subsurface equipment described herein. Repeated descriptions of like elements are omitted for brevity.

According to one or more embodiments of the present disclosure described with reference to FIGS. 1 and 2, techniques are described that support determining, maintaining, and/or updating a chemical mixture for a drilling fluid 121.

In an example implementation, the computing device 105 may process substances data 235 (also referred to herein as drilling fluid substances data) and target fluid properties data 240 using machine learning algorithm 230. The machine learning algorithm 230 may be implemented by one or more machine learning models 190 described herein. The substances data 235 may include candidate additives for creating an initial chemical mixture for a drilling fluid 121. The target fluid properties data 240 may include target properties (e.g., as determined by an operator, drill site specifications, or the like) for a drilling fluid 121.

The computing device 105 may electronically generate (e.g., in response to processing the substances data 235 and the target fluid properties data 240 using the algorithm 230) a data file representative of the chemical mixture. In an example, the data file includes a digital mix sheet 182 including parameters for preparing the chemical mixture. Non-limiting examples of the parameters include an indication of a product(s) to be added to the chemical mixture, temporal instances of when to add the product(s) to the chemical mixture, amounts of the product(s), mix rate associated with adding the product(s), and the like.

The software systems 225 may provide the digital mix sheet 182 to automated mixing system 210. The automated mixing system 210 may be implemented, for example, at computing device 105 and/or at fluid tank 120. In an example, based on the digital mix sheet 182 (and parameters included in the digital mix sheet 182), the automated mixing system 210 may combine substances 211 (e.g., additive 211-*a* through additive 211-*c*) in preparing the chemical mixture, and accordingly, a drilling fluid 121. The automated mixing system 210 may provide the drilling fluid 121 to active drilling fluid system 215. Active drilling fluid system 215 may be implemented by aspects of surface equipment 110 described herein.

Sensors 122 may capture real-time measurement data 192 associated with the drilling fluid 121 and provide the real-time measurement data 192 to software systems 225. Active drilling fluid system 215 may further provide manually obtained measurement data 193 (e.g., as obtained through a manual fluid check 220 by an operator) to software systems 225. The computing device 105 (e.g., at software systems 225) may aggregate the real-time measurement data 192 and measurement data 193 as current fluid properties data 245.

The computing device 105 (e.g., at software systems 225) may compare the target fluid properties data 240 and current fluid properties data 245. Based on the comparison, the computing device 105 may maintain or update the chemical mixture (and the digital mix sheet 182) for the drilling fluid 121. As described herein, descriptions associated with maintaining or updating the chemical mixture may include maintaining or updating the digital mix sheet 182.

In an example, the computing device 105 may update the chemical mixture based on determining that a difference between a target value and a measured value of a target property for the drilling fluid 121 exceeds a threshold difference value. In another example, the computing device 105 may identify trends in measured values of the target property (e.g., based on multiple real-time measurements by sensors 122), and the computing device 105 may update the chemical mixture based on determining that the measured values are trending such that a future measured value will exceed the threshold difference value.

According to one or more embodiments of the present disclosure, the systems and techniques described herein support the creation, modification, and updating of chemical mixtures for a drilling fluid 121 as described herein, based on interdependencies between one or more target properties of the drilling fluid 121 (as included in target fluid properties data 240) and one or more candidate additives (as included in substances data 235) which may be added for the chemical mixtures. Example aspects of determining a chemical mixture for a drilling fluid 121 based on interdependencies between target properties (as included in target fluid properties data 240) of the drilling fluid 121 and candidate additives (as included in substances data 235) are described herein.

In an example, the computing device 105 may determine the chemical mixture for the drilling fluid 121 based on a first interdependency of a first target property (e.g., fluid density) and a substance 211-*a* to be added for the chemical mixture, and further, a second interdependency of the first target property and a substance 211-*b* to be added for the chemical mixture. In one or more embodiments, the techniques may include determining the chemical mixture further based on additional and/or alternative interdependencies.

For example, determining the chemical mixture may be based on an interdependency of the first target property, a second target property (e.g., rheology), and the substance 211-*a*. Additionally, or alternatively, the computing device 105 may determine the chemical mixture based on an interdependency of the first target property, the second target property, and substance 211-*b*. Additionally, or alternatively, the techniques may include determining the chemical mixture based on an interdependency of the first target property, the second target property, the substance 211-*a*, and the substance 211-*b*. Additionally, or alternatively, the techniques may include determining the chemical mixture further based on an interdependency of the first target property, the second target property, and one or more combinations including at least one of the substance 211-*a* or the substance 211-*b*.

The embodiments of the present disclosure are not limited to the example interdependencies described herein, and the techniques described herein may include determining the chemical mixture based on any suitable interdependency (or combination of interdependencies).

Non-limiting examples of substances 211 to be added to the chemical mixture include viscosifiers, thinners, weighting materials, lubricants, filtration control additives, loss circulation material, and the like.

Non-limiting examples of target properties of the chemical mixture include fluid density, rheology, viscosity, fluid loss, chemical composition, pH, salinity, filtration, and the like.

Another example of the interdependencies described herein includes solving for targets in viscosity (V) and filtration control (FC) simultaneously. For example, a Viscosifier A (Va) may have a primary level impact on viscosity, but a secondary level impact on filtration control. A filtration control additive B (FCb) may have a primary impact on filtration control, but a secondary level impact on viscosity. The system 101 (using machine learning algorithm 230 and machine learning model(s) 190) may consider, in combination, the effects of Viscosifier A (Va) and filtration control additive B (FCb) in association with achieving a desired target.

In some aspects, the system 101 (and machine learning algorithm 230 and machine learning model(s) 190) may calculate respective weighting factors for Viscosifier A (Va) based on the primary level impact on viscosity the secondary level impact on filtration control, and the system 101 may calculate respective weighting factors for filtration control additive B (FCb) based on the primary impact on filtration control and the secondary level impact on viscosity. The system 101 may apply the weighting factors in determining parameters described herein (e.g., temporal instances of when to add a product(s), amounts of the product(s), mix rate associated with adding the product(s), and the like) for adding Viscosifier A (Va), filtration control additive B (FCb), or other substances for preparing the chemical mixture for drilling fluid 121. In some aspects, the machine learning algorithms described herein may apply a priority scale for adding substances based on desired target properties of a drilling fluid 121.

In some examples, the desired target may include a target filtration control value (or range) or a target viscosity value (or range). In some other examples, the desired target may include a combination of targets (e.g., values, ranges) including at least one of target filtration control and target viscosity, such that the desired target includes a set of parameters for optimization as a whole.

In some cases, some chemicals may have additive effects. For example, two substances 211 of the same or different type (e.g., two viscosifiers, two filtration control agents, a viscosifier and a control agent, or the like) may work better together and be interdependent in achieving a target property (or properties) for a drilling fluid 121 compared to independently adding the substances 211. The systems and techniques described herein may account for the additive effects in association with determining parameters for substances 211 to be added to the chemical mixture (e.g., temporal instances of when to add a product(s), amounts of the product(s), mix rate, and the like).

Figure 3:
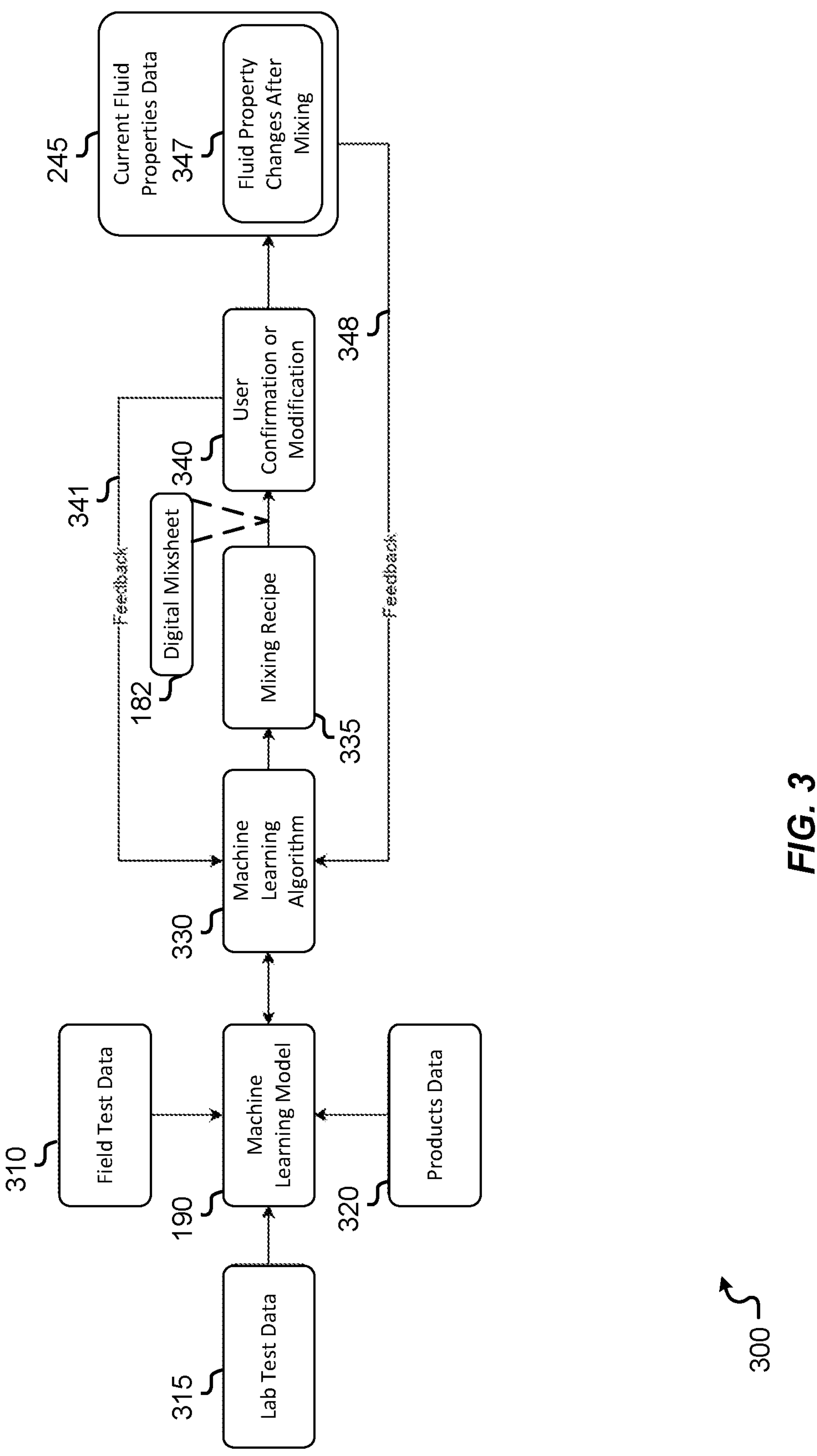
FIG. 3 illustrates an example block diagram supportive of determining, maintaining, and updating a chemical mixture for a drilling fluid in accordance with one or more embodiments of the present disclosure.

FIG. 3 illustrates an example block diagram 300 supportive of determining, maintaining, and updating a chemical mixture (and a corresponding digital mix sheet 182) for a drilling fluid 121 in accordance with one or more embodiments of the present disclosure. Features described with reference to block diagram 300 may be implemented by system 100, system 101, hardware systems 205, and software systems 225 described with reference to FIGS. 1 and 2. Repeated descriptions of like elements are omitted for brevity.

Referring to FIG. 3, machine learning model 190 may be a trained predictive model. In some aspects, the machine learning model(s) 190 may be initially trained based on field test data 310 and lab test data 315 associated with one or more reference chemical mixtures. For example, the field test data 310 and lab test data 315 may include reference parameters (e.g., product(s) added, temporal instances of when the product(s) were added, amounts of the product(s), mix rate associated with the addition of the product(s), and the like) used in association with preparing reference chemical mixtures for a drilling fluid.

The computing device 105 may implement machine learning algorithm 330 using the machine learning model(s) 190, in which the machine learning model(s) 190 are used to process products data 320. In some aspects, products data 320 may include substances data 235 and target fluid properties data 240 described with reference to FIG. 2.

In an example, the computing device 105 (and machine learning algorithm 330) may, in response to processing the products data 320 using the machine learning model(s) 190, generate a mixing recipe 335. The mixing recipe 335 may include mixing parameters (e.g., product(s) to be added to a chemical mixture, temporal instances of when to add the product(s) to the chemical mixture, amounts of the product(s), mix rate associated with adding the product(s), and the like) described herein for producing a drilling fluid 121. The computing device 105 may produce digital mix sheet 182 based on the mixing recipe 335.

The computing device 105 provides operators an interface for reviewing, confirming, or modifying the digital mix sheet 182. In one or more embodiments, once the digital mix sheet 182 has been confirmed or modified by an operator at 340, the computing device 105 may provide corresponding user feedback 341 to the machine learning algorithm 330.

In an example, based on feedback 341 indicating user modification of the digital mix sheet 182, the machine learning algorithm 330 may update the machine learning model(s) 190 and/or the mixing recipe 335. The computing device 105 may further update the digital mix sheet 182 and again provide the digital mix sheet 182 for operator review via an interface.

In another example, based on feedback 341 indicating user confirmation of the digital mix sheet 182, the machine learning algorithm 330 may affirm the prediction by the machine learning model(s) 190. The computing device 105 may provide the digital mix sheet 182 to mixing equipment (or processing circuitry included in the mixing equipment, or a computing device 105 controlling the mixing equipment) described herein, and the mixing equipment may produce drilling fluid 121.

The computing device 105 may receive real-time measurement data 192 and/or measurement data 193 (as described with reference to FIGS. 1 and 2). The computing device 105 may provide, as feedback 348 to the machine learning algorithm 330, current fluid properties data 245 associated with the drilling fluid 121. In an example, for cases in which additional substances have been added to/mixed into the drilling fluid 121, the current fluid properties data 245 may include fluid property changes 347 of the drilling fluid 121.

In an example, for cases in which the current fluid properties data 245 matches target fluid properties data 240 associated with the drilling fluid 121 (e.g., the difference between each measured property and a corresponding fluid property is less than a threshold value), the machine learning algorithm 330 may affirm the machine learning model(s) 190. In another example, for cases in which the current fluid properties data 245 does not match the target fluid properties data 240 associated with the drilling fluid 121, the machine learning algorithm 330 may update the machine learning model(s) 190.

Accordingly, for example, as described with reference to FIG. 3, the systems and techniques described herein support continuous or semi-continuous verification and/or updating of machine learning model(s) 190 for use with an automated drilling fluids mixing service.

The systems and techniques described herein include continuous learning algorithms capable of adapting and updating predictive models (e.g., machine learning model(s) 190 described herein) continuously as new data becomes available. The continuous learning algorithms provide advantages in scenarios in which the data distribution may change over time, and the continuous learning algorithms described herein support maintaining the predictive models so as to be updated in accordance with changes in the data.

The continuous learning algorithms described herein support the autonomous drilling fluids mixing services described herein, where data (e.g., fluid properties, effects of substances on fluid properties, interdependencies between substances and fluid properties, and the like) may evolve over time. The algorithms ensure that the predictive models remain effective and relevant in dynamic environments by adapting and learning from new information while retaining knowledge from the past.

Non-limiting examples of continuous learning algorithms supported by aspects of the present disclosure include online learning, incremental learning, transfer learning, adaptive learning rate, elastic models, ensemble methods, reinforcement learning with exploration, catastrophic forgetting mitigation, and memory networks.

Online learning algorithms update the model with each incoming data point one at a time. The model is adjusted incrementally, and old data may be discarded to prioritize recent information. This approach is suitable for real-time applications and situations where data (e.g., fluid properties, effects of substances on fluid properties, interdependencies between substances and fluid properties, and the like) is constantly changing.

Incremental learning is similar to online learning but updates the model in small batches rather than on individual data points. Incremental learning helps reduce computational overhead while still allowing the model to adapt to changing data distributions.

Transfer learning involves training a model on one task or dataset (e.g., determining a chemical mixture for a drilling fluid 121 with respect to one or more target properties) and then fine-tuning the model on a related task or dataset (e.g., determining a chemical mixture for a drilling fluid 121 with respect to one or more different target properties, one or more overlapping target properties, one or more different substances, one or more overlapping substances, and the like). Transfer learning leverages knowledge learned from the source task to expedite learning on the target task, which may be especially valuable when new data is limited or costly to acquire.

In some continuous learning scenarios, the systems and techniques described herein may implement an adaptive learning rate (the step size for updating model parameters). Techniques described herein may implement adaptive learning using techniques such as, for example, stochastic gradient descent with learning rate schedules or adaptive learning rate methods which adjust the learning rate based on the historical gradients, ensuring appropriate updates as data evolves.

Elastic models combine multiple base models with varying complexity. Elastic models use techniques such as, for example, model selection and weighting to adaptively choose the best-performing base model for a particular data distribution. Using elastic models may ensure that the model can handle different patterns over time.

The systems and techniques described herein may use ensemble methods (e.g., Online Bagging and Online Boosting) to combine predictions from multiple base models, for example, in an online or incremental fashion. Such techniques allow the ensemble to adapt to changing data distributions by giving more weight to models that perform well on recent data.

In reinforcement learning, the systems and techniques described herein may achieve continuous learning by maintaining a balance between exploiting the current policy (making decisions based on what is known to work for, for example, obtaining target properties of a drilling fluid 121) and exploring new strategies to adapt to changes in the environment. In some examples, the systems and techniques may implement techniques such as, for example, epsilon-greedy exploration to achieve the balance.

In deep learning, catastrophic forgetting may occur when a model trained on a new task significantly degrades its performance on previously learned tasks. The systems and techniques described herein may incorporate elastic weight consolidation (EWC) and progressive neural networks (PNN) to mitigate catastrophic forgetting by preserving knowledge of previous tasks while learning new tasks.

The systems and techniques described herein may use memory-augmented neural networks such as, for example, neural turing machines (NTMs) and differentiable neural computers (DNCs), which use external memory to store information and update the information as new data arrives. The storing and updating allows the memory-augmented neural networks to learn continuously and adapt to changing data distributions.

Figure 4:
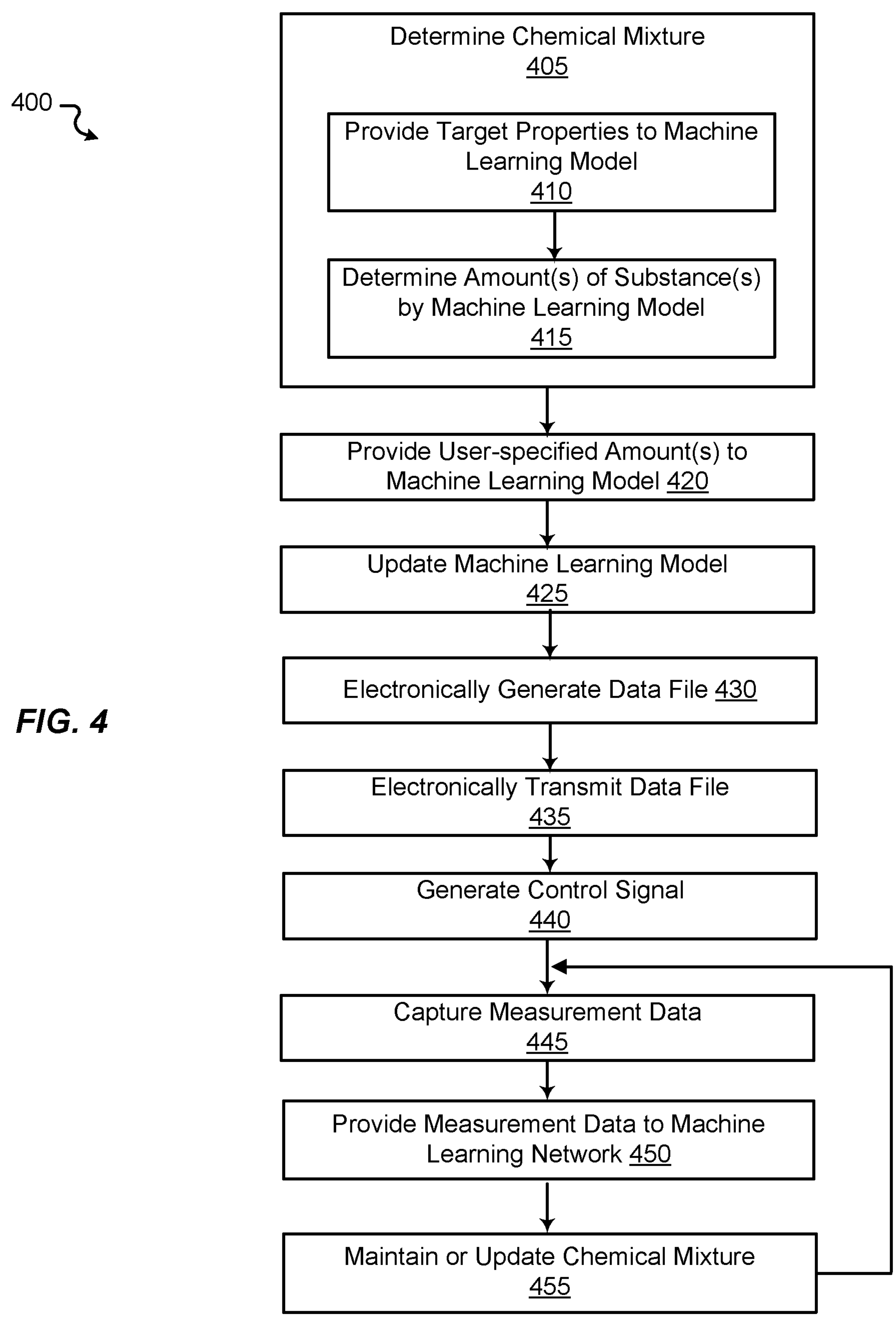
FIG. 4 illustrates an example flowchart of a method in accordance with one or more embodiments of the present disclosure.

FIG. 4 illustrates an example flowchart of a method 400 in accordance with one or more embodiments of the present disclosure. The method 400 is an example computer-implemented method that may be implemented by the example aspects of a system 101 and/or a computing device 105 as described herein.

The method 400 may be implemented by a processor and a memory of a computing device 105. In an example, the memory includes executable program instructions stored thereon that, when executed by the processor, cause the processor to perform operations of method 400. The memory may be included in a computer readable storage medium of the computing device 105.

At 405, the method 400 includes determining a chemical mixture for a drilling fluid based on: a first interdependency of a first target property of a set of properties associated with the drilling fluid and a first substance to be added for the chemical mixture; and a second interdependency of the first target property and a second substance to be added for the chemical mixture.

In some aspects, determining the chemical mixture is further based on a third interdependency of: the first target property; the second target property; and the first substance, the second substance, or combinations including at least one of the foregoing.

In some aspects, determining the chemical mixture is further based on a third interdependency of: the first target property; the first substance; and the second substance.

In some aspects, determining the chemical mixture may be based on an output from a machine learning model. For example, at 410, the method 400 includes providing the first target property and the second target property to a machine learning model.

At 415, the machine learning model determines at least one of: a first amount of the first substance for addition to the chemical mixture based on the first interdependency; and a second amount of the second substance for addition to the chemical mixture based on the second interdependency.

In some aspects, the machine learning model determines at least one of: a first amount of the first substance for addition to the chemical mixture based on at least in part on a third interdependency of: the first target property; the second target property; and the first substance, the second substance, or combinations including at least one of the foregoing; and a second amount of the second substance for addition to the chemical mixture based on the third interdependency.

At 420, the method 400 includes providing a first user-specified amount of the first substance, a second user-specified amount of the second substance, or both to a machine learning model.

At 425, the method 400 includes updating the machine learning model based on the first user-specified amount, the second user-specified amount, or both, where updating the machine learning model includes updating the first interdependency, the second interdependency, or both.

At 430, the method 400 includes electronically generating a data file representative of the chemical mixture based on a file format that is vendor agnostic.

At 435, the method 400 includes electronically transmitting the data file using a communication protocol that is hardware agnostic, vendor agnostic, or both.

At 440, the method 400 includes generating a control signal associated with preparing the chemical mixture based on electronically processing the data file.

At 445, the method 400 includes capturing real-time measurement data associated with the drilling fluid, where the real-time measurement data includes the first measurement of the first target property and the second measurement of the second target property.

At 450, the method 400 includes providing the real-time measurement data to a machine learning model, where the machine learning model generates an output (at 410) associated with maintaining or updating the chemical mixture based on processing the real-time measurement data.

At 455, the method 400 includes maintaining or updating the chemical mixture based on a first measurement of the first target property, a second measurement of a second target property of the set of properties, or combinations including one of the foregoing.

In some aspects, maintaining or updating the chemical mixture is based on at least one of: a first difference value between the first measurement and a first target value of the first target property; and a second difference value between the second measurement and a second target value of the second target property.

In some aspects, determining (at 405), maintaining (at 455), or updating (at 455) the chemical mixture includes setting, for at least one of the first substance and the second substance: a target amount of at least one of the first substance and the second substance for the chemical mixture; a target temporal instance associated with adding at least one of the first substance and the second substance to the chemical mixture; and a target mixture rate associated with adding at least one of the first substance and the second substance to the chemical mixture.

In some aspects, (not illustrated), the method 400 includes training the machine learning model based on field test data and lab test data associated with one or more reference chemical mixtures, where at least one of determining (at 405), maintaining (at 455), and updating (at 455) the chemical mixture is based on an output generated by the machine learning model.

In some aspects, (not illustrated), the method 400 includes providing second real-time measurement data to the machine learning model, where the second real-time measurement data includes an updated first measurement of the first target property and an updated second measurement of the second target property. In some aspects, the method 400 includes updating the machine learning model based on the second real-time measurement data, where updating the machine learning model comprises updating the first interdependency, the second interdependency, or both.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

Set forth below are some embodiments of the foregoing disclosure:

Example 1. A computer-implemented method comprising: determining a chemical mixture for a drilling fluid based on: a first interdependency of a first target property of a set of properties associated with the drilling fluid and a first substance to be added for the chemical mixture; and a second interdependency of the first target property and a second substance to be added for the chemical mixture; and maintaining or updating the chemical mixture based on a first measurement of the first target property, a second measurement of a second target property of the set of properties, or combinations including one of the foregoing.

Example 2. The computer-implemented method of Example 1, wherein determining the chemical mixture is further based on a third interdependency of: the first target property; the second target property; and the first substance, the second substance, or combinations including at least one of the foregoing.

Example 3. The computer-implemented method of Example 1, wherein determining the chemical mixture is further based on a third interdependency of: the first target property; the first substance; and the second substance.

Example 4. The computer-implemented method of Example 1, wherein maintaining or updating the chemical mixture is based on at least one of: a first difference value between the first measurement and a first target value of the first target property; and a second difference value between the second measurement and a second target value of the second target property.

Example 5. The computer-implemented method of Example 1, further comprising: providing the first target property and the second target property to a machine learning model, wherein the machine learning model determines at least one of: a first amount of the first substance for addition to the chemical mixture based on the first interdependency; and a second amount of the second substance for addition to the chemical mixture based on the second interdependency.

Example 6. The computer-implemented method of Example 1, further comprising: providing the first target property and the second target property to a machine learning model, wherein the machine learning model determines at least one of: a first amount of the first substance for addition to the chemical mixture based on at least in part on a third interdependency of: the first target property; the second target property; and the first substance, the second substance, or combinations including at least one of the foregoing; and a second amount of the second substance for addition to the chemical mixture based at least in part on the third interdependency.

Example 7. The computer-implemented method of Example 1, further comprising: capturing real-time measurement data associated with the drilling fluid, wherein the real-time measurement data comprises the first measurement of the first target property and the second measurement of the second target property; providing the real-time measurement data to a machine learning model, wherein the machine learning model generates an output associated with maintaining or updating the chemical mixture based on processing the real-time measurement data; providing second real-time measurement data to the machine learning model, wherein the second real-time measurement data comprises an updated first measurement of the first target property and an updated second measurement of the second target property; and updating the machine learning model based on the second real-time measurement data, wherein updating the machine learning model comprises updating the first interdependency, the second interdependency, or both.

Example 8. The computer-implemented method of Example 1, providing a first user-specified amount of the first substance, a second user-specified amount of the second substance, or both to a machine learning model; and updating the machine learning model based on the first user-specified amount, the second user-specified amount, or both, wherein updating the machine learning model comprises updating the first interdependency, the second interdependency, or both.

Example 9. The computer-implemented method of Example 1, wherein determining, maintaining, or updating the chemical mixture comprises setting, for at least one of the first substance and the second substance: a target amount of at least one of the first substance and the second substance for the chemical mixture; a target temporal instance associated with adding at least one of the first substance and the second substance to the chemical mixture; and a target mixture rate associated with adding at least one of the first substance and the second substance to the chemical mixture.

Example 10. The computer-implemented method of Example 1, further comprising: electronically generating a data file representative of the chemical mixture based on a file format that is vendor agnostic; electronically transmitting the data file using a communication protocol that is hardware agnostic, vendor agnostic, or both; and generating a control signal associated with preparing the chemical mixture based on electronically processing the data file.

Example 11. The computer-implemented method of Example 1, further comprising: training a machine learning model based on field test data and lab test data associated with one or more reference chemical mixtures, wherein at least one of determining, maintaining, and updating the chemical mixture is based on an output generated by the machine learning model.

Example 12. A system comprising: analysis equipment comprising a processor and a memory, wherein the memory comprises instructions stored thereon that, when executed by the processor, cause the processor to perform operations comprising: determining a chemical mixture for a drilling fluid based on: a first interdependency of a first target property of a set of properties associated with the drilling fluid and a first substance to be added for the chemical mixture; and a second interdependency of the first target property and a second substance to be added for the chemical mixture; and maintaining or updating the chemical mixture based on a first measurement of the first target property, a second measurement of a second target property of the set of properties, or combinations including one of the foregoing.

Example 13. The system of Example 12, wherein determining the chemical mixture is further based on a third interdependency of: the first target property; the second target property; and the first substance, the second substance, or combinations including at least one of the foregoing.

Example 14. The system of Example 12, wherein determining the chemical mixture is further based on a third interdependency of: the first target property; the first substance; and the second substance.

Example 15. The system of Example 12, wherein maintaining or updating the chemical mixture is based on at least one of: a first difference value between the first measurement and a first target value of the first target property; and a second difference value between the second measurement and a second target value of the second target property.

Example 16. The system of Example 12, wherein the instructions are further executable by the processor to perform operations comprising: providing the first target property and the second target property to a machine learning model, wherein the machine learning model determines at least one of: a first amount of the first substance for addition to the chemical mixture based on the first interdependency; and a second amount of the second substance for addition to the chemical mixture based on the second interdependency.

Example 17. The system of Example 12, wherein the instructions are further executable by the processor to perform operations comprising: providing the first target property and the second target property to a machine learning model, wherein the machine learning model determines at least one of: a first amount of the first substance for addition to the chemical mixture based on at least in part on a third interdependency of: the first target property; the second target property; and the first substance, the second substance, or combinations including at least one of the foregoing; and a second amount of the second substance for addition to the chemical mixture based at least in part on the third interdependency.

Example 18. The system of Example 12, wherein the instructions are further executable by the processor to perform operations comprising: capturing real-time measurement data associated with the drilling fluid, wherein the real-time measurement data comprises the first measurement of the first target property and the second measurement of the second target property; and providing the real-time measurement data to a machine learning model, wherein the machine learning model generates an output associated with maintaining or updating the chemical mixture based on processing the real-time measurement data; providing second real-time measurement data to the machine learning model, wherein the second real-time measurement data comprises an updated first measurement of the first target property and an updated second measurement of the second target property; and updating the machine learning model based on the second real-time measurement data, wherein updating the machine learning model comprises updating the first interdependency, the second interdependency, or both.

Example 19. The system of Example 12, wherein the instructions are further executable by the processor to: providing a first user-specified amount of the first substance, a second user-specified amount of the second substance, or both to a machine learning model; and updating the machine learning model based on the first user-specified amount, the second user-specified amount, or both, wherein updating the machine learning model comprises updating the first interdependency, the second interdependency, or both.

Example 20. A computer program product comprising a computer readable storage medium having program instructions embodied therewith, the program instructions executable by a processor to cause the processor to perform operations comprising: determining a chemical mixture for a drilling fluid based on: a first interdependency of a first target property of a set of properties associated with the drilling fluid and a first substance to be added for the chemical mixture; and a second interdependency of the first target property and a second substance to be added for the chemical mixture; and maintaining or updating the chemical mixture based on a first measurement of the first target property, a second measurement of a second target property of the set of properties, or combinations including one of the foregoing.

The use of the terms “a” and “an” and “the” and similar referents in the context of describing the invention (especially in the context of the following claims) are to be construed to cover both the singular and the plural, unless otherwise indicated herein or clearly contradicted by context. Further, it should be noted that the terms “first,” “second,” and the like herein do not denote any order, quantity, or importance, but rather are used to distinguish one element from another. The terms “about”, “substantially” and “generally” are intended to include the degree of error associated with measurement of the particular quantity based upon the equipment available at the time of filing the application. For example, “about” and/or “substantially” and/or “generally” can include a range of ±8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A computer-implemented method comprising:

determining a chemical mixture for a drilling fluid based on:

a first interdependency of a first target property of a set of properties associated with the drilling fluid and a first substance to be added for the chemical mixture; and a second interdependency of the first target property and a second substance to be added for the chemical mixture; and maintaining or updating the chemical mixture based on a first measurement of the first target property, a second measurement of a second target property of the set of properties, or combinations including one of the foregoing.

2. The computer-implemented method of claim 1, wherein determining the chemical mixture is further based on a third interdependency of:

the first target property;

the second target property; and the first substance, the second substance, or combinations including at least one of the foregoing.

3. The computer-implemented method of claim 1, wherein determining the chemical mixture is further based on a third interdependency of:

the first target property;

the first substance; and the second substance.

4. The computer-implemented method of claim 1, wherein maintaining or updating the chemical mixture is based on at least one of:

a first difference value between the first measurement and a first target value of the first target property; and a second difference value between the second measurement and a second target value of the second target property.

5. The computer-implemented method of claim 1, further comprising:

providing the first target property and the second target property to a machine learning model, wherein the machine learning model determines at least one of:

a first amount of the first substance for addition to the chemical mixture based on the first interdependency; and a second amount of the second substance for addition to the chemical mixture based on the second interdependency.

6. The computer-implemented method of claim 1, further comprising:

providing the first target property and the second target property to a machine learning model, wherein the machine learning model determines at least one of:

a first amount of the first substance for addition to the chemical mixture based on at least in part on a third interdependency of:

the first target property;

the second target property; and the first substance, the second substance, or combinations including at least one of the foregoing; and a second amount of the second substance for addition to the chemical mixture based at least in part on the third interdependency.

7. The computer-implemented method of claim 1, further comprising:

capturing real-time measurement data associated with the drilling fluid, wherein the real-time measurement data comprises the first measurement of the first target property and the second measurement of the second target property;

providing the real-time measurement data to a machine learning model, wherein the machine learning model generates an output associated with maintaining or updating the chemical mixture based on processing the real-time measurement data;

providing second real-time measurement data to the machine learning model, wherein the second real-time measurement data comprises an updated first measurement of the first target property and an updated second measurement of the second target property; and updating the machine learning model based on the second real-time measurement data, wherein updating the machine learning model comprises updating the first interdependency, the second interdependency, or both.

8. The computer-implemented method of claim 1, providing a first user-specified amount of the first substance, a second user-specified amount of the second substance, or both to a machine learning model; and updating the machine learning model based on the first user-specified amount, the second user-specified amount, or both, wherein updating the machine learning model comprises updating the first interdependency, the second interdependency, or both.

9. The computer-implemented method of claim 1, wherein determining, maintaining, or updating the chemical mixture comprises setting, for at least one of the first substance and the second substance:

a target amount of at least one of the first substance and the second substance for the chemical mixture;

a target temporal instance associated with adding at least one of the first substance and the second substance to the chemical mixture; and a target mixture rate associated with adding at least one of the first substance and the second substance to the chemical mixture.

10. The computer-implemented method of claim 1, further comprising:

electronically generating a data file representative of the chemical mixture based on a file format that is vendor agnostic;

electronically transmitting the data file using a communication protocol that is hardware agnostic, vendor agnostic, or both; and generating a control signal associated with preparing the chemical mixture based on electronically processing the data file.

11. The computer-implemented method of claim 1, further comprising:

training a machine learning model based on field test data and lab test data associated with one or more reference chemical mixtures, wherein at least one of determining, maintaining, and updating the chemical mixture is based on an output generated by the machine learning model.

12. A system comprising:

analysis equipment comprising a processor and a memory, wherein the memory comprises instructions stored thereon that, when executed by the processor, cause the processor to perform operations comprising:

determining a chemical mixture for a drilling fluid based on:

a first interdependency of a first target property of a set of properties associated with the drilling fluid and a first substance to be added for the chemical mixture; and a second interdependency of the first target property and a second substance to be added for the chemical mixture; and maintaining or updating the chemical mixture based on a first measurement of the first target property, a second measurement of a second target property of the set of properties, or combinations including one of the foregoing.

13. The system of claim 12, wherein determining the chemical mixture is further based on a third interdependency of:

the first target property;

the second target property; and the first substance, the second substance, or combinations including at least one of the foregoing.

14. The system of claim 12, wherein determining the chemical mixture is further based on a third interdependency of:

the first target property;

the first substance; and the second substance.

15. The system of claim 12, wherein maintaining or updating the chemical mixture is based on at least one of:

a first difference value between the first measurement and a first target value of the first target property; and a second difference value between the second measurement and a second target value of the second target property.

16. The system of claim 12, wherein the instructions are further executable by the processor to perform operations comprising:

providing the first target property and the second target property to a machine learning model, wherein the machine learning model determines at least one of:

a first amount of the first substance for addition to the chemical mixture based on the first interdependency; and a second amount of the second substance for addition to the chemical mixture based on the second interdependency.

17. The system of claim 12, wherein the instructions are further executable by the processor to perform operations comprising:

providing the first target property and the second target property to a machine learning model, wherein the machine learning model determines at least one of:

a first amount of the first substance for addition to the chemical mixture based on at least in part on a third interdependency of:

the first target property;

the second target property; and the first substance, the second substance, or combinations including at least one of the foregoing; and a second amount of the second substance for addition to the chemical mixture based at least in part on the third interdependency.

18. The system of claim 12, wherein the instructions are further executable by the processor to perform operations comprising:

capturing real-time measurement data associated with the drilling fluid, wherein the real-time measurement data comprises the first measurement of the first target property and the second measurement of the second target property; and providing the real-time measurement data to a machine learning model, wherein the machine learning model generates an output associated with maintaining or updating the chemical mixture based on processing the real-time measurement data;

providing second real-time measurement data to the machine learning model, wherein the second real-time measurement data comprises an updated first measurement of the first target property and an updated second measurement of the second target property; and updating the machine learning model based on the second real-time measurement data, wherein updating the machine learning model comprises updating the first interdependency, the second interdependency, or both.

19. The system of claim 12, wherein the instructions are further executable by the processor to:

providing a first user-specified amount of the first substance, a second user-specified amount of the second substance, or both to a machine learning model; and updating the machine learning model based on the first user-specified amount, the second user-specified amount, or both, wherein updating the machine learning model comprises updating the first interdependency, the second interdependency, or both.

20. A computer program product comprising a non-transitory computer readable storage medium having program instructions embodied therewith, the program instructions executable by a processor to cause the processor to perform operations comprising:

determining a chemical mixture for a drilling fluid based on:

a first interdependency of a first target property of a set of properties associated with the drilling fluid and a first substance to be added for the chemical mixture; and a second interdependency of the first target property and a second substance to be added for the chemical mixture; and maintaining or updating the chemical mixture based on a first measurement of the first target property, a second measurement of a second target property of the set of properties, or combinations including one of the foregoing.

* * * * *